(12) United States Patent
Long et al.

(10) Patent No.: US 8,751,182 B2
(45) Date of Patent: Jun. 10, 2014

(54) SYSTEM AND METHOD FOR TESTING SERIAL PORTS

(75) Inventors: Zhi-Jian Long, Shenzhen (CN);
Ming-Xiang Hu, Shenzhen (CN);
Jun-Min Chen, Shenzhen (CN); Le Lin, Shenzhen (CN); Xiao-Fei Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 372 days.

(21) Appl. No.: 13/209,449

(22) Filed: Aug. 15, 2011

(65) Prior Publication Data
US 2012/0095717 A1 Apr. 19, 2012

(30) Foreign Application Priority Data

Oct. 14, 2010 (CN) .......................... 2010 1 0508308

(51) Int. Cl.
*G01R 31/00* (2006.01)
*G06F 19/00* (2011.01)
*G06F 11/22* (2006.01)
*G06F 11/25* (2006.01)

(52) U.S. Cl.
CPC .............. *G06F 11/221* (2013.01); *G06F 11/25* (2013.01); *G06F 11/2221* (2013.01); *G06F 11/2284* (2013.01)

USPC .............. 702/117; 702/64; 702/118; 714/25; 714/43

(58) Field of Classification Search
CPC ... G06F 11/221; G06F 11/25; G06F 11/2221; G06F 11/2284; G01R 31/31715; G01R 31/31728
USPC .............. 702/64, 117–123; 700/12; 714/724, 714/727, 736, 25, 43
See application file for complete search history.

(56) References Cited

U.S. PATENT DOCUMENTS

| | | | |
|---|---|---|---|
| 7,447,945 B2 * | 11/2008 | Zhu et al. | 714/43 |
| 2004/0102916 A1 * | 5/2004 | Chen et al. | 702/117 |
| 2004/0102917 A1 * | 5/2004 | Chen et al. | 702/120 |
| 2007/0113133 A1 * | 5/2007 | Liu et al. | 714/736 |

* cited by examiner

*Primary Examiner* — John H Le
(74) *Attorney, Agent, or Firm* — Novak Druce Connolly Bove + Quigg LLP

(57) ABSTRACT

In a system and method for testing a serial port of a computing device, the serial port electronically connects to a test fixture. Test data is sent to a receive data (RXD) pin by a transmit data (TXD) pin. A test result is received from the serial port by the RXD pin. The TXD pin and the RXD pin work normally if the test data is identical to the test result. When voltages of a request to send (RTS) pin and a data terminal ready (DTR) pin are set at high level, the RTS pin, a data carrier detect (DCD) pin, the DTR pin, a ring indicator (RI) pin, a data send ready (DSR) pin and a clear to send (CTS) pin work normally, upon the condition that status values of the serial port indicate the voltages of the above six pins are at high level.

19 Claims, 4 Drawing Sheets

SYSTEM AND METHOD FOR TESTING SERIAL PORTS

BACKGROUND

1. Technical Field

Embodiments of the present disclosure relate generally to I/O port testing, and more particularly, to a system and method for testing a serial port of a motherboard of a computing device.

2. Description of Related Art

A motherboard of a computing device may have a serial port for communicating with peripheral devices, and one type of serial port is a 9-pin serial port. After the motherboard is assembled, manufacturers need to test the 9-pin serial port. In some test methods, operators may connect the 9-pin serial port to an optical-coupled chip. However, optical-coupled chips are expensive. Furthermore, the test methods only test a receive data (RXD) pin, a transmit data (TXD) pin, a data terminal ready (DTR) pin, a data send ready (DSR) pin, a clear to send (CTS) pin, and a request to send (RTS) pin, and do not test the remaining pins, such as a ring indicator (RI) pin and a data carrier detect (DCD) pin. What is needed, therefore, is a method for testing the 9-pin serial port to overcome the limitations described.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
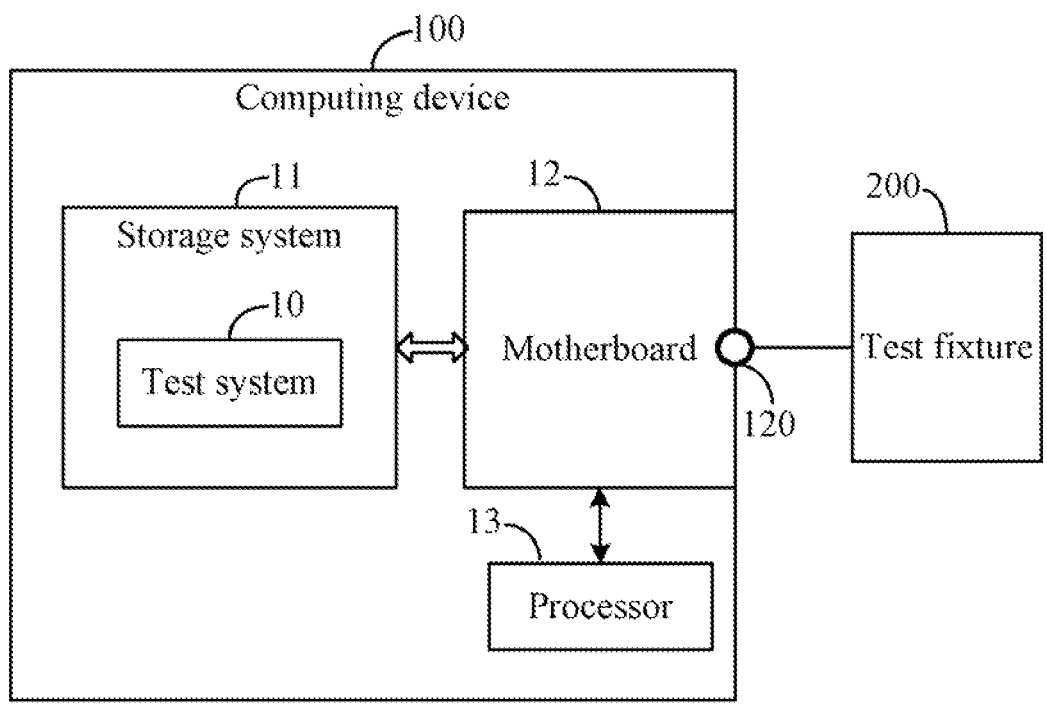
FIG. 1 is a block diagram of one embodiment of a computing device including a test system for testing a serial port on a motherboard connected to a test fixture.

FIG. 1 is a block diagram of one embodiment of a computing device 100 including a test system 10 for testing a serial port 120 on a motherboard 12 connected to a test fixture 200. In the embodiment, the computing device 100 includes a storage system 11, the motherboard 12, and at least one processor 13. The motherboard 12 includes the serial port 120. The test system 10 may be in the form of one or more programs that are stored in the storage system 11, and can test a signal transmission function of the serial port 120. In one embodiment, the computing device 100 may be a desktop computer, a notebook computer, a server, a workstation, or other such device. It should be apparent that FIG. 1 is just one example of the computing device 100 that can be included with more or fewer components than shown in other embodiments, or a different configuration of the various components.

The storage system 11 stores one or more programs, such as an operating system, and other applications of the computing device 100. In one embodiment, the storage system 11 may be random access memory (RAM) for temporary storage of information, and/or a read only memory (ROM) for permanent storage of information. In other embodiments, the storage system 11 may also be an external storage device, such as a hard disk, a storage card, or a data storage medium. The at least one processor 13 executes computerized operations of the computing device 100 and other applications, to provide functions of the computing device 100.

Figure 2:
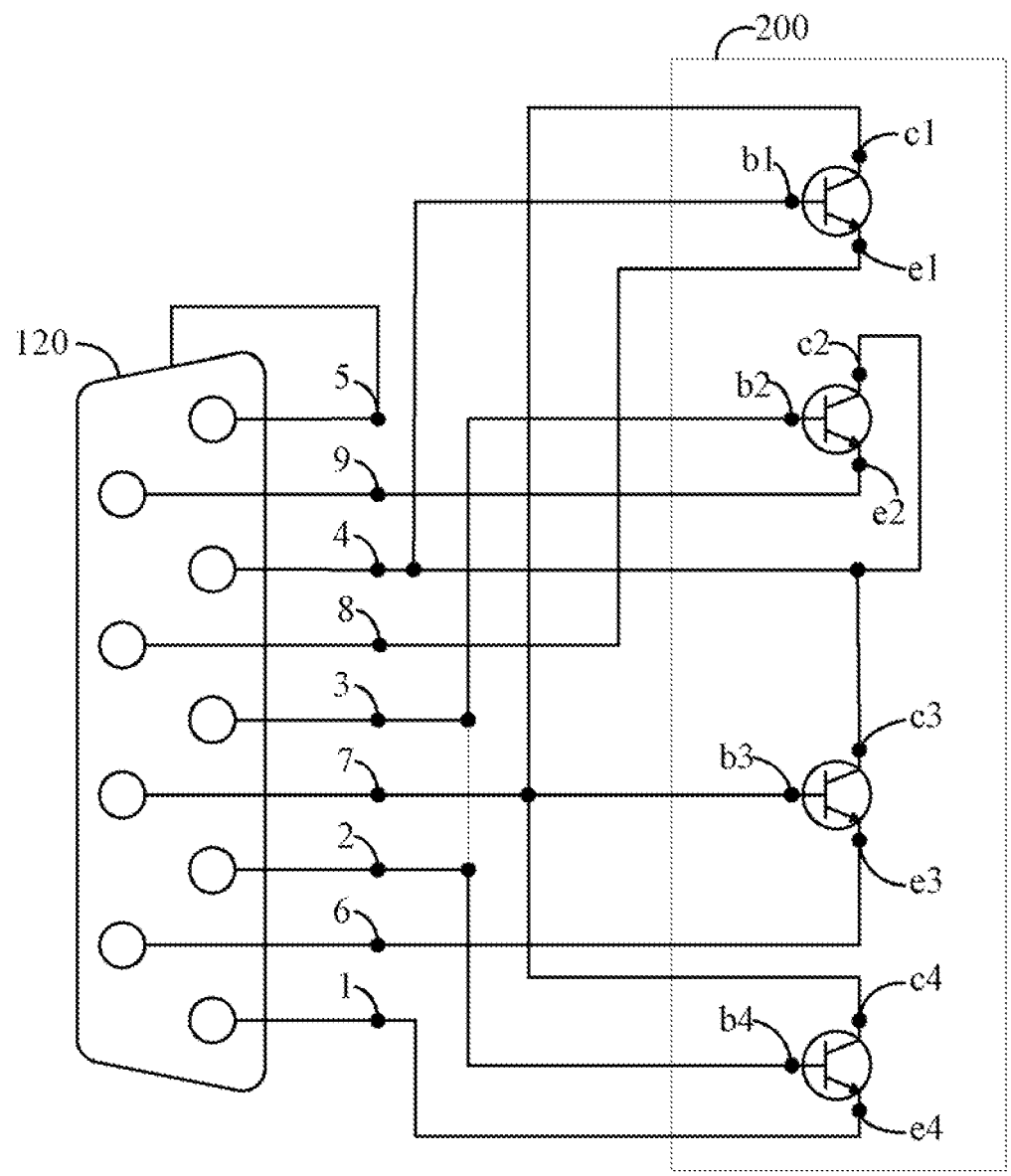
FIG. 2 is a schematic diagram of the test fixture connected to the computing device of FIG. 1.

FIG. 2 is a schematic diagram of the test fixture 200 connected to the computing device 100 of FIG. 1. The test fixture 200 is electronically connected to the serial port 120. The serial port 120 includes nine pins: a signal ground (GND) pin 5, a ring indicator (RI) pin 9, a data terminal ready (DTR) pin 4, a clear to send (CTS) pin 8, a transmit data (TXD) pin 3, a request to send (RTS) pin 7, a receive data (RXD) pin 2, a data send ready (DSR) pin 6, and a data carrier detect (DCD) pin 1. The GND pin 5 is grounded.

Voltages of the pins of the serial port 120 are represented by binary status values respectively. For example, if the status value of the DTR pin 4 is logic 1, the voltage of the DTR pin 4 may be at a high level, such as two volts. If the status value of the DTR pin 4 is logic 0, the voltage of the DTR pin 4 may be at a low level, such as zero volts. Furthermore, the DCD pin 1, the RI pin 9 and the DSR pin 6 can be disabled, and the TXD pin 3, the RXD pin 2, the GND pin 5, the DTR pin 4, and the RTS pin 7 are enabled. The voltage of the DTR pin 4 and the RTS pin 7 can be set by the test system 10.

In the embodiment, the test fixture 200 consists of four npn transistors. The four npn transistors connect to the serial port 120 to form five circuit loops: (1) a first circuit loop that is formed by connecting the TXD pin 3 to the RXD pin 2; (2) a second circuit loop that is formed by connecting the DTR pin 4 to a base b1 of a first transistor, connecting the RTS pin 7 to a collector c1 of the first transistor, and connecting the CTS pin 8 to an emitter e1 of the first transistor; (3) a third circuit loop that is formed by connecting the TXD pin 3 to a base b2 of a second transistor, connecting the DTR pin 4 to a collector c2 of the second transistor, and connecting the RI pin 9 to an emitter e2 of the second transistor; (4) a fourth circuit loop that is formed by connecting the RTS pin 7 to a base b3 of a third transistor, connecting the DTR pin 4 to a collector c3 of the third transistor, and connecting the DSR pin 6 to an emitter e3 of the third transistor; and (5) a fifth circuit loop that is formed by connecting the TXD pin 3 to a base b4 of a fourth transistor, connecting the RTS pin 7 to a collector c4 of the fourth transistor, and connecting the DCD pin 1 to an emitter e4 of the fourth transistor.

Figure 3:
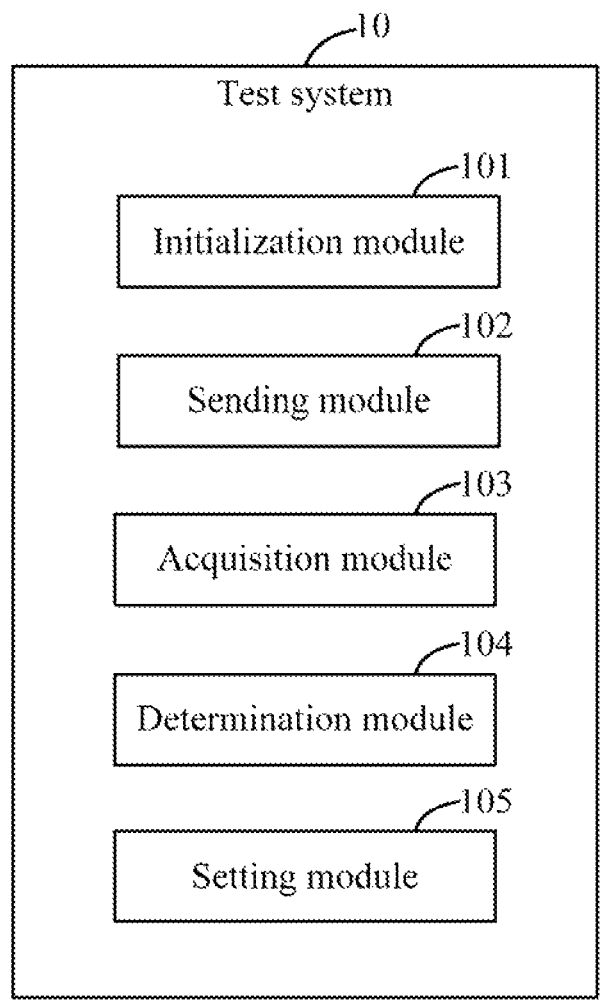
FIG. 3 is a block diagram of one embodiment of functional modules of the test system included in the computing device of FIG. 1.

FIG. 3 is a block diagram of one embodiment of functional modules of the test system 10 included in the computing device 100 of FIG. 1. The test system 10 may include a plurality of functional modules each comprising one or more programs or computerized codes that can be accessed and executed by the at least one processor 13. In one embodiment, the test system 10 includes an initialization module 101, a sending module 102, an acquisition module 103, a determination module 104, and a setting module 105. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

The initialization module 101 is operable to initialize the serial port 120 according to predetermined configuration information. The configuration information may include the status values of the serial port 120.

The sending module 102 is operable to enable the TXD pin 3 to send test data into the first circuit loop. The sending module 102 generates various test data for testing the computing device 100. According to the characteristics of the 9-pin serial port, the sending module 102 may send the test data to the TXD pin 3 for setting the TXD pin 3 to be at a high level, such as two volts.

The acquisition module 103 is operable to enable the RXD pin 2 to receive a test result generated by the first circuit loop.

The determination module 104 is operable to compare the test data with the test result to determine whether the TXD pin 3 and the RXD pin 2 work normally. If the test result received by the RXD pin 2 is identical to the test data sent by the TXD pin 3, the determination module 104 determines that the TXD pin 3 and the RXD pin 2 work normally. If the test result received by the RXD pin 2 is not identical to the test data sent by the TXD pin 3, or the RXD pin 2 does not receive any test result, the determination module 104 determines that the TXD pin 3 and the RXD pin 2 do not work normally.

The setting module 105 is operable to set the voltage of the DTR pin 4 and the RTS pin 7 to a high level, such as two volts. In other embodiments, the setting module 105 may set the voltage of the DTR pin 4 and the RTS pin 7 to a low level, such as zero volts.

The acquisition module 103 is further operable to acquire the status values of the serial port 120, each of the status values indicating the current voltages of the corresponding pins of the serial port 120.

The determination module 104 is further operable to determine whether the DCD pin 1, the RTS pin 7, the RI pin 9, the DTR pin 4, the DSR pin 6, and the CTS pin 8 work normally according to the status values of the serial port 120.

When the test data is sent by the TXD pin 3 and the voltage of the RTS pin 7 is set at high level, the voltages of the base b4 and the collector c4 of the fourth transistor should be at high level. According to the characteristics of the transistor, the fourth transistor conducts and the emitter e4 of the fourth transistor should also be at high level. The determination module 105 determines whether the voltages of the DCD pin 1 that electronically connects to the emitter e4 of the fourth transistor and the RTS pin 7 are at high level according to the status values of the serial port 120. If the status values of the serial port 120 indicate that the voltages of the RTS pin 7 and the DCD pin 1 are at high level, the RTS pin 7 and the DCD pin 1 work normally. If the status values of the serial port 120 indicate the voltages of the RTS pin 7 and the DCD pin 1 are not at high level, the RTS pin 7 and the DCD pin 1 do not work normally.

When the test data is sent by the TXD pin 3 and the voltage of the DTR pin 4 is set at high level, the voltages of the base b2 and the collector c2 of the second transistor should be at high level, then the second transistor conducts and the emitter e2 of the second transistor should be at high level. The determination module 104 determines whether the voltages of the DTR pin 4 and the RI pin 9 that electronically connects to the emitter e2 of the second transistor are at high level according to the status values of the serial port 120. If the status values of the serial port 120 indicate that the voltages of the DTR pin 4 and the RI pin 9 are at high level, the DTR pin 4 and the RI pin 9 work normally. If the status values of the serial port 120 indicate the voltages of the DTR pin 4 and the RI pin 9 are not at high level, the DTR pin 4 and the RI pin 9 do not work normally.

When the voltages of the RTS pin 7 and the DTR pin 4 are set at high level, the base b1 and the collector c1 of the first transistor, and the base b3 and the collector c3 of the third transistor should be at high level. The first transistor and the third transistor conduct. The emitter e1 of the first transistor and the emitter e3 of the third transistor should be at high level. The CTS pin 8 electronically connects to the emitter e1, and the DSR pin 6 electronically connects to the emitter e3. The determination module 104 determines whether the voltages of the CTS pin 8 and the DSR pin 6 are at high level according to the status values of the serial port 120. If the status values of the serial port 120 indicate that the voltages of the CTS pin 8 and the DSR pin 6 are at high level, the CTS pin 8 and the DSR pin 6 work normally. If the status values of the serial port 120 indicate that the voltages of the CTS pin 8 and the DSR pin 6 are not at high level, the CTS pin 8 and the DSR pin 6 do not work normally.

Figure 4:
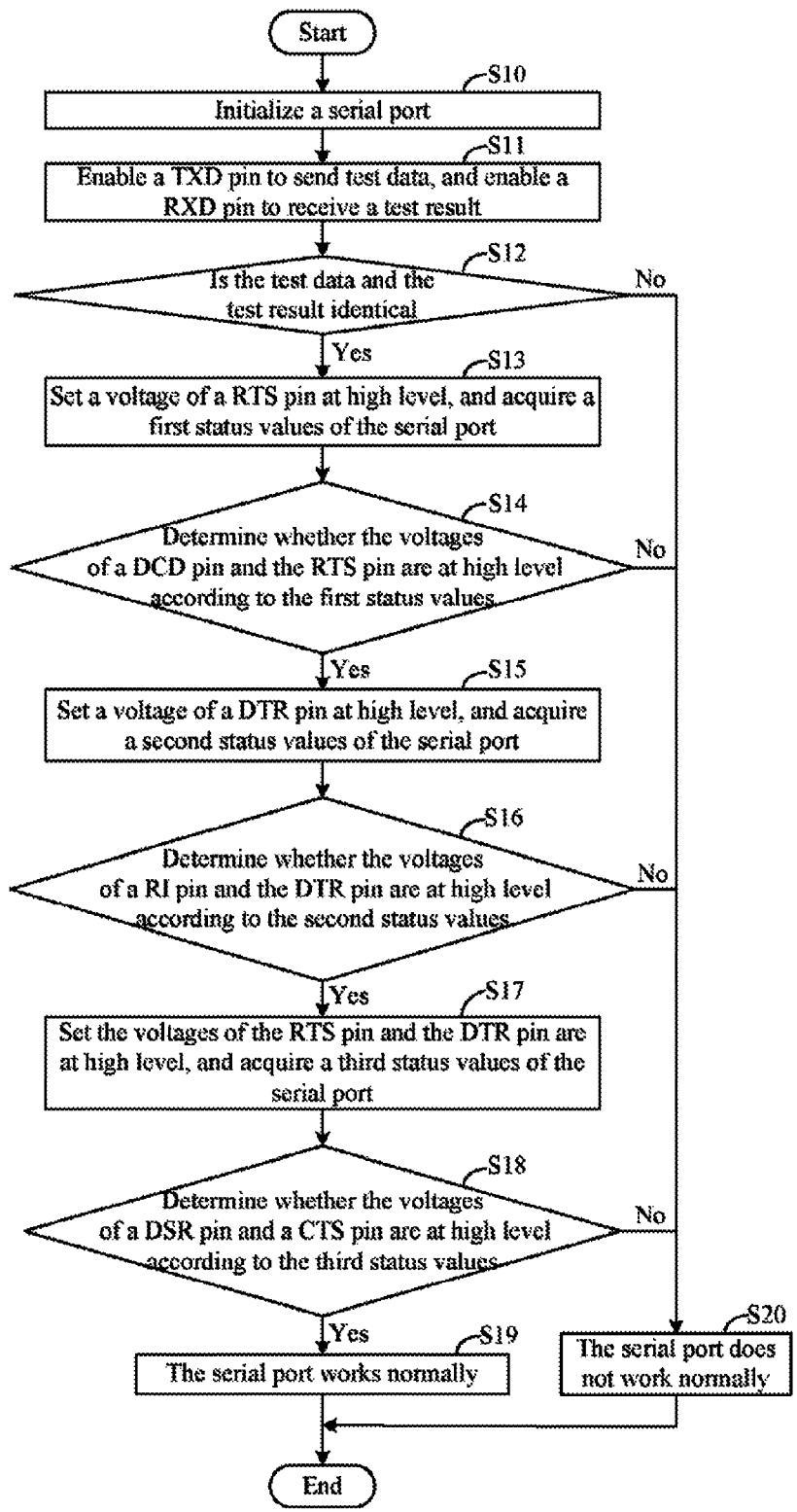
FIG. 4 is a flowchart of one embodiment of a method for testing a serial port on a motherboard of the computing device of FIG. 1.

FIG. 4 is a flowchart of one embodiment of a method for testing a serial port 120 on a motherboard 12 of the computing device 100 of FIG. 1. Depending on the embodiment, additional blocks may be added, others removed, and the ordering of the blocks may be changed.

In block S10, the initialization module 101 initializes the serial port 120 according to predetermined configuration information. The configuration information may include the status values of the serial port 120.

In block S11, the sending module 102 enables the TXD pin 3 to send test data into the first circuit loop, and the acquisition module 103 enables the RXD pin 2 to receive a test result generated by the first circuit loop.

In block S12, the determination module 104 compares the test data with the test result. If the test data is identical to the test result, the RXD pin 2 and the TXD pin 3 work normally, and block S13 is implemented. If the test data is not identical to the test result, the RXD pin 2 and the TXD pin 3 do not work normally, and block S20 is implemented.

In block S13, the setting module 105 sets the voltage of the RTS pin 7 at high level, and the acquisition module 103 acquires a first status values of the serial port 120.

In block S14, the determination module 104 determines whether the voltages of the RTS pin 7 and the DCD pin 1 are at high level according to the first status values of the serial port 120. If the first status values of the serial port 120 indicate that the voltages of the RTS pin 7 and the DCD pin 1 are at high level, the RTS pin 7 and the DCD pin 1 work normally, and block S15 is implemented. If the first status values of the serial port 120 indicate the voltages of the RTS pin 7 and the DCD pin 1 are not at high level, the RTS pin 7 and the DCD pin 1 do not work normally, and block S20 is implemented.

In block S15, the setting module 105 sets the voltage of the DTR pin 4 at high level, and the acquisition module 103 acquires a second status values of the serial port 120.

In block S16, the determination module 104 determines whether the voltages of the DTR pin 4 and the RI pin 9 are at high level according to the second status values of the serial port 120. If the second status values of the serial port 120 indicate that the voltages of the DTR pin 4 and the RI pin 9 are at high level, the DTR pin 4 and the RI pin 9 work normally, and block S17 is implemented. If the second status values of the serial port 120 indicate the voltages of the DTR pin 4 and the RI pin 9 are not at high level, the DTR pin 4 and the RI pin 9 do not work normally, and block S20 is implemented.

In block S17, the setting module 105 sets the voltages of the RTS pin 7 and the DTR pin 4 at high level, and the acquisition module 103 acquires a third status values of the serial port 120.

In block S18, the determination module 104 determines whether the voltages of the CTS pin 8 and the DSR pin 6 are at high level according to the third status values of the serial port 120. If the third status values of the serial port 120 indicate that the voltages of the CTS pin 8 and the DSR pin 6 are at high level, the CTS pin 8 and the DSR pin 6 work normally, and block S19 is implemented. If the third status values of the serial port 120 indicate that the voltages of the CTS pin 8 and the DSR pin 6 are not at high level, the CTS pin 8 and the DSR pin 6 do not work normally, and block S20 is implemented.

In block S19, the determination module 104 determines that the serial port 120 passes the test if the serial port 120 works normally.

In block S20, the determination module 104 determines that the serial port 120 fails the test if the serial port 120 does not work normally.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computing device, comprising:
    a storage system;
    at least one processor;
    a motherboard comprising a serial port; and
    one or more programs stored in the storage system and executed by the at least one processor, the one or more programs comprising:
    a sending module operable to enable a transmit data (TXD) pin of the serial port to send test data to a receive data (RXD) pin of the serial port;
    an acquisition module operable to enable the RXD pin to receive a test result from the serial port, and acquire status values of the serial port;
    a determination module operable to compare the test data with the test result, and determine that the TXD pin and the RXD pin work normally upon the condition that the test data is identical to the test result;
    a setting module operable to set voltages of a data terminal ready (DTR) pin and a request to send (RTS) pin of the serial port at high level;
    the determination module further operable to determine that the RTS pin and a data carrier detect (DCD) pin of the serial port work normally, upon the condition that the status values indicate the voltages of the RTS pin and the DCD pin are at high level;
    the determination module further operable to determine that the DTR pin and a ring indicator (RI) pin of the serial port work normally, upon the condition that the status values indicate the voltages of the DTR pin and the RI pin are at high level; and
    the determination module further operable to determine that a data send ready (DSR) pin and a clear to send (CTS) pin of the serial port work normally, upon the condition that the status values indicate the voltages of the DSR pin and the CTS pin are at high level.

2. The computing device of claim 1, wherein the serial port electronically connects to a test fixture that comprises four npn transistors, and the four npn transistors connect to the serial port to form five circuit loops that comprise:
    a first circuit loop that is formed by connecting the TxD pin to the RXD pin;
    a second circuit loop that is formed by connecting the DTR pin to a base of a first transistor, connecting the RTS pin to a collector of the first transistor, and connecting the CTS pin to an emitter of the first transistor;
    a third circuit loop that is formed by connecting the TXD pin to a base of a second transistor, connecting the DTR pin to a collector of the second transistor, and connecting the RI pin to an emitter of the second transistor;
    a fourth circuit loop that is formed by connecting the RTS pin to a base of a third transistor, connecting the DTR pin to a collector of the third transistor, and connecting the DSR pin to an emitter of the third transistor; and
    a fifth circuit loop that is formed by connecting the TXD pin to a base of a fourth transistor, connecting the RTS pin to a collector of the fourth transistor, and connecting the DCD pin to an emitter of the fourth transistors.

3. The computing device of claim 1, further comprising an initialization module that is operable to initialize the serial port according to predetermined configuration information.

4. The computing device of claim 1, wherein the status values are logic 0 or logic 1.

5. The computing device of claim 1, wherein the determination module is further operable to determine that the RTS pin and the DCD pin do not work normally, upon the condition that the status values indicate the voltages of the RTS pin and the DCD pin are not at high level.

6. The computing device of claim 1, wherein the determination module is further operable to determine that the DTR pin and the RI pin do nor work normally, upon the condition that the status values indicate the voltages of the DTR pin and the RI pin are not at high level.

7. The computing device of claim 1, wherein the determination module is further operable to determine that the DSR pin and the CTS pin do not work normally, upon the condition that the status values indicate the voltages of the DSR pin and the CTS pin are not at high level.

8. A method for testing a serial port of a computing device, the method comprising:
    (a) enabling a transmit data (TXD) pin of the serial port to send test data to a receive data (RXD) pin of the serial port, and enabling the RXD pin to receive a test result from the serial port;
    (b) comparing the test data with the test result, and determining that the TXD pin and the RXD pin work normally upon the condition that the test data is identical to the test result;
    (c) acquiring a first status values of the serial port when a voltage of a request to send (RTS) pin of the serial port is set at high level;
    (d) determining that the RTS pin and a data carrier detect (DCD) pin of the serial port work normally, upon the condition that the first status values indicate the voltages of the RTS pin and the DCD pin are at high level;
    (e) acquiring a second status values of the serial port when a voltage of a data terminal ready (DTR) pin of the serial port is set at high level;
    (f) determining that the DTR pin and a ring indicator (RI) pin of the serial port work normally, upon the condition that the second status values indicate the voltages of the DTR pin and the RI pin are at high level;
    (g) acquiring a third status values of the serial port when the voltages of the RTS pin and DTR pin are set at high level; and
    (h) determining that a data send ready (DSR) pin and a clear to send (CTS) pin of the serial port work normally, upon the condition that the third status values indicate the voltages of the DSR pin and the CTS pin are at high level.

9. The method of claim 8, wherein the serial port electronically connects to a test fixture that comprises four npn transistors, and the four npn transistors connect to the serial port to form five circuit loops that comprise:

a first circuit loop that is formed by connecting the TXD pin to the RXD pin;

a second circuit loop that is formed by connecting the DTR pin to a base of a first transistor, connecting the RTS pin to a collector of the first transistor, and connecting the CTS pin to an emitter of the first transistor;

a third circuit loop that is formed by connecting the TXD pin to a base of a second transistor, connecting the DTR pin to a collector of the second transistor, and connecting the RI pin to an emitter of the second transistor;

a fourth circuit loop that is formed by connecting the RTS pin to a base of a third transistor, connecting the DTR pin to a collector of the third transistor, and connecting the DSR pin to an emitter of the third transistor; and a fifth circuit loop that is formed by connecting the TXD pin to a base of a fourth transistor, connecting the RTS pin to a collector of the fourth transistor, and connecting the DCD pin to an emitter of the fourth transistors.

10. The method of claim 8, further comprising:

initializing the serial port according to predetermined configuration information.

11. The method of claim 8, wherein the step (d) comprises:

determining that the RTS pin and the DCD pin do not work normally, upon the condition that the first status values indicate the voltages of the RTS pin and the DCD pin are not at high level.

12. The method of claim 8, wherein the step (f) comprises:

determining that the DTR pin and the RI pin do not work normally, upon the condition that the second status values indicate the voltages of the DTR pin and the RI pin are not at high level.

13. The method of claim 8, wherein the step (h) comprises:

determining that the DSR pin and the CTS pin do not work normally, upon the condition that the third status values indicate the voltages of the DSR pin and the CTS pin are not at high level.

14. A non-transitory storage medium storing a set of instructions, the set of instructions capable of being executed by a processor of a computing device, causes the computing device to execute a method for testing a serial port of the computing device, the method comprising:

(a) enabling a transmit data (TXD) pin of the serial port to send test data to a receive data (RXD) pin of the serial port, and enabling the RXD pin to receive a test result from the serial port;

(b) comparing the test data with the test result, and determining that the TXD pin and the RXD pin work normally upon the condition that the test data is identical to the test result;

(c) acquiring a first status values of the serial port when a voltage of a request to send (RTS) pin of the serial port is set at high level;

(d) determining that the RTS pin and a data carrier detect (DCD) pin of the serial port work normally, upon the condition that the first status values indicate the voltages of the RTS pin and the DCD pin are at high level;

(e) acquiring a second status values of the serial port when a voltage of a data terminal ready (DTR) pin of the serial port is set at high level;

(f) determining that the DTR pin and a ring indicator (RI) pin of the serial port work normally, upon the condition that the second status values indicate the voltages of the DTR pin and the RI pin are at high level;

(g) acquiring a third status values of the serial port when the voltages of the RTS pin and DTR pin are set at high level; and (h) determining that a data send ready (DSR) pin and a clear to send (CTS) pin of the serial port work normally, upon the condition that the third status values indicate the voltages of the DSR pin and the CTS pin are at high level.

15. The non-transitory storage medium of claim 14, wherein the serial port electronically connects to a test fixture that comprises four npn transistors, and the four npn transistors connect to the serial port to form five circuit loops that comprise:

a first circuit loop that is formed by connecting the TXD pin to the RXD pin;

a second circuit loop that is formed by connecting the DTR pin to a base of a first transistor, connecting the RTS pin to a collector of the first transistor, and connecting the CTS pin to an emitter of the first transistor;

a third circuit loop that is formed by connecting the TXD pin to a base of a second transistor, connecting the DTR pin to a collector of the second transistor, and connecting the RI pin to an emitter of the second transistor;

a fourth circuit loop that is formed by connecting the IRIS pin to a base of a third transistor, connecting the DTR pin to a collector of the third transistor, and connecting the DSR pin to an emitter of the third transistor; and a fifth circuit loop that is formed by connecting the TXD pin to a base of a fourth transistor, connecting the RTS pin to a collector of the fourth transistor, and connecting the DCD pin to an emitter of the fourth transistors.

16. The non-transitory storage medium of claim 14, wherein the method further comprises:

initializing the serial port according to predetermined configuration information.

17. The non-transitory storage medium of claim 14, wherein the step (d) comprises:

determining that the RTS pin and the DCD pin do not work normally, upon the condition that the first status values indicate the voltages of the RTS pin and the DCD pin are not at high level.

18. The non-transitory storage medium of claim 14, wherein the step (f) comprises:

determining that the DTR pin and the RI pin do not work normally, upon the condition that the second status values indicate the voltages of the DTR pin and the RI pin are not at high level.

19. The non-transitory storage medium of claim 14, wherein the step (h) comprises:

determining that the DSR pin and the CTS pin do not work normally, upon the condition that the third status values indicate the voltages of the DSR pin and the CTS pin are not at high levels.

* * * * *